United States Patent
Williams et al.

(10) Patent No.: US 7,178,605 B2
(45) Date of Patent: Feb. 20, 2007

(54) AGRICULTURAL TOOLBAR FLOAT SYSTEM

(75) Inventors: James R. Williams, Clarion, IA (US); Mitchell Redenius, West Des Moines, IA (US)

(73) Assignee: Hagie Manufacturing Co., Clarion, IA (US)

( * ) Notice: Subject to any disclaimer, the term of this patent is extended or adjusted under 35 U.S.C. 154(b) by 0 days.

(21) Appl. No.: 10/705,176

(22) Filed: Nov. 10, 2003

(65) Prior Publication Data

US 2005/0098327 A1    May 12, 2005

(51) Int. Cl.
*A01B 63/00* (2006.01)
*A01B 79/00* (2006.01)

(52) U.S. Cl. .......................... 172/1; 172/477; 172/500

(58) Field of Classification Search ........ 172/497–500, 172/506, 452, 454–456, 463, 464, 473–480, 172/1

See application file for complete search history.

(56) References Cited

U.S. PATENT DOCUMENTS

| | | | | |
|---|---|---|---|---|
| 4,355,689 A | * | 10/1982 | Friggstad | 172/311 |
| 5,161,622 A | * | 11/1992 | Godbersen | 172/140 |
| 5,180,028 A | * | 1/1993 | Perrenoud, Jr. | 180/235 |

FOREIGN PATENT DOCUMENTS

| | | | |
|---|---|---|---|
| JP | 07177944 A | * | 7/1995 |
| JP | 07332453 A | * | 12/1995 |

\* cited by examiner

*Primary Examiner*—Christopher J. Novosad
(74) *Attorney, Agent, or Firm*—Brett Trout

(57) ABSTRACT

A ground engaging agricultural toolbar for accommodating uneven terrain. The toolbar is provided with a plurality of long arms with multiple articulations, actuated and controlled by hydraulic cylinders. The hydraulic cylinders may be actuated to fold the toolbar for transport and to prevent the toolbar from becoming damaged as it moves across uneven terrain. The toolbar may also be actuated to anticipated variations in the terrain, to further prevent potential damage to the machine.

14 Claims, 4 Drawing Sheets

AGRICULTURAL TOOLBAR FLOAT SYSTEM

BACKGROUND OF THE INVENTION

1. Field of the Invention

The present invention relates to an agricultural toolbar and, more particularly, to a float system which allows extensible ends of the toolbar to "float" along uneven terrain to reduce damage to the toolbar and associated agricultural vehicle.

2. Description of the Prior Art

Toolbars are known in the art for use in association with various agricultural pursuits, including seeding, fertilizing, plowing and the like. Such systems typically involve a generally horizontal bar provided with several depending implements to modify a particular area of ground. It is desirable to provide a toolbar with as many depending implements as possible, to treat as many rows as possible, during a single pass of the toolbar. As it is difficult to move very large toolbars on the highway, most toolbars are designed with a folding capability, which allows the toolbar to be folded for transport and extended for use.

An additional drawback associated with very long toolbars is that the longer the toolbar, the more likely the toolbar will extend over uneven terrain during use. If the toolbar encounters an area of ground which begins to slope near either end of the toolbar, either the entire toolbar will tilt, thereby potentially disengaging one of the implements from the soil, or the toolbar will bend or break, requiring the toolbar to be repaired or rebuilt. It would, therefore, be desirable to provide a toolbar with sectional components designed to contour with uneven terrain.

Although it is known in the art to provide toolbars which tilt, tilting does not solve the problem associated with very long toolbars. While it would be possible to simply articulate long toolbars, such articulation may give rise to additional problems. The articulated ends of the toolbar may move violently upward in response to encountering uneven terrain, and then move violently downward once the unevenness has passed. Such violent jarring not only would subject the toolbar to additional wear and maintenance, but would also potentially subject the implements to costly downtime and repairs.

It would, therefore, be desirable to provide an articulated toolbar system which eliminates violent jarring associated with the toolbar passing uneven terrain. The prior art difficulties described hereinabove are substantially eliminated by the present invention.

SUMMARY OF THE INVENTION

In an advantage provided by this invention, an articulated toolbar is provided to allow homogenous implement utilization over uneven terrain.

Advantageously, this invention provides for the use of a long toolbar, which contours to uneven terrain without subjecting the ends of the toolbar to damage associated with violent upward and downward movement in response to uneven terrain.

Advantageously, this invention provides a system which allows for actuated adjustment of the buffering of the ends of a longer articulated toolbar, to anticipate and attenuate the effects of various types of terrain and soil conditions.

Advantageously, this invention provides a system for utilizing a toolbar float mechanism in conjunction with existing toolbar hydraulics.

In an embodiment of this invention, a ground engaging agricultural toolbar is provided, having a first bar section and a second bar section. The bar sections are each provided with ground engaging means and are pivotably coupled to one another. Means are provided between the bar sections for buffering pivoting of the bar sections relative to one another. The buffering is in response to the first and second ground engaging means engaging uneven terrain.

In the preferred embodiment, the toolbar is provided with a plurality of bar sections, each associated with a plurality of ground engaging members. The bar sections are hingeably coupled to one another, with each pair being spanned by a hydraulic cylinder. The hydraulic cylinders are preferably provided with multiple valves, which may be adjusted by a user to pivot the bar sections relative to one another, or adjust the buffering capability of the cylinders.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
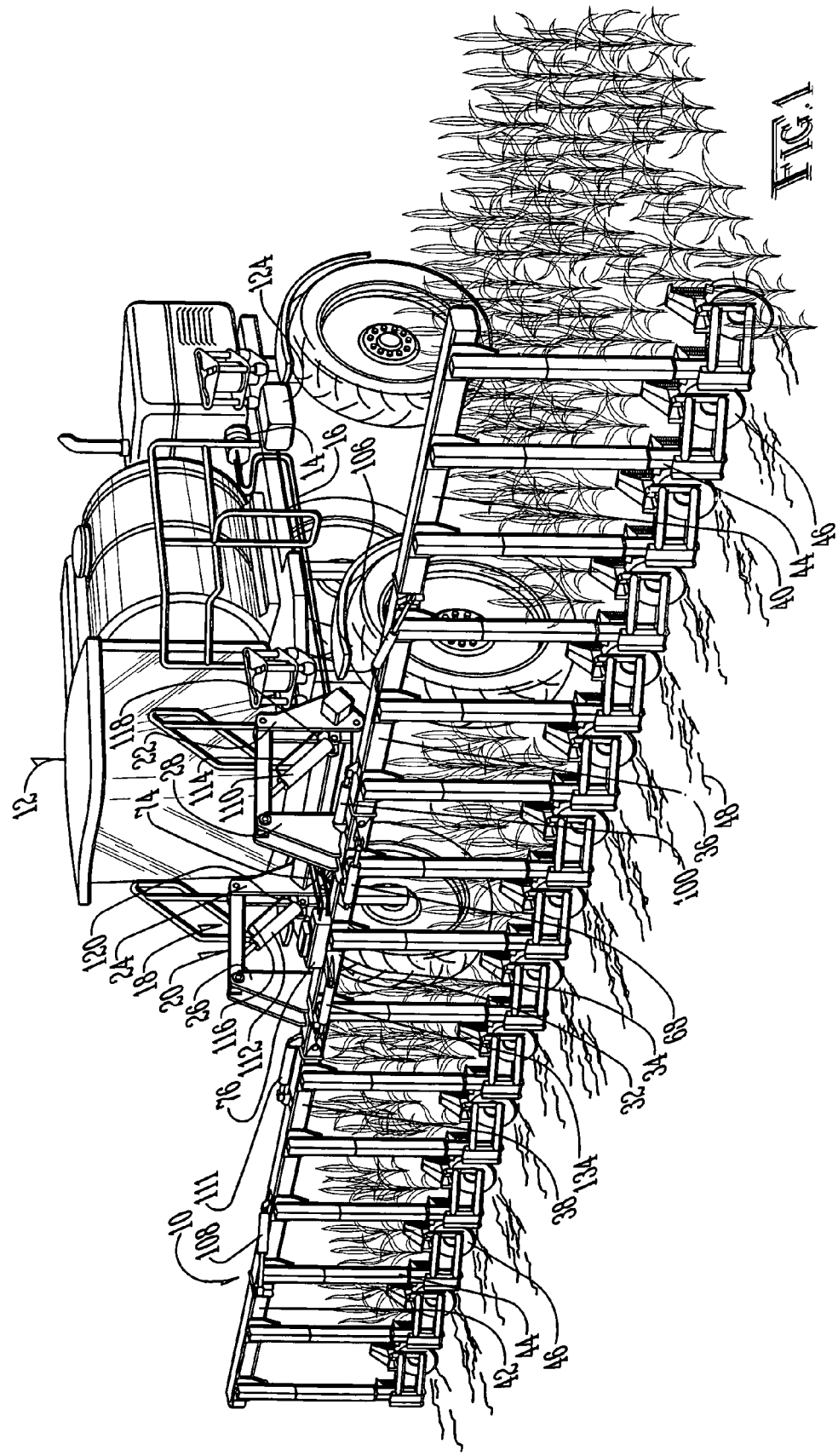
FIG. 1 illustrates a perspective view of the agricultural toolbar of the present invention, and associated vehicle.

With reference to the drawings, a floating toolbar according to the present invention is shown generally as (10) in FIG. 1. Coupled to the floating toolbar (10) is a vehicle (12). While the vehicle (12) may be of any type known in the art, in the preferred embodiment, the vehicle (12) is an STS12 sprayer, manufactured by Hagie Manufacturing Company, Clarion, Iowa. The vehicle (12) is preferably provided with a hydraulic motor (14), coupled in a manner such as that well known in the art to a plurality of hydraulic lines (16). Provided on the vehicle (12) is a hydraulically actuated boom (18), coupled by the hydraulic lines (16) to the hydraulic motor (14). The boom (18) includes a four-bar parallel linkage (20), such as those well known in the art, to maintain the connection bars (22) and (24) parallel to the two mounting bars (26) and (28) as the connection bars (22) and (24) are raised and lowered.

Figure 2:
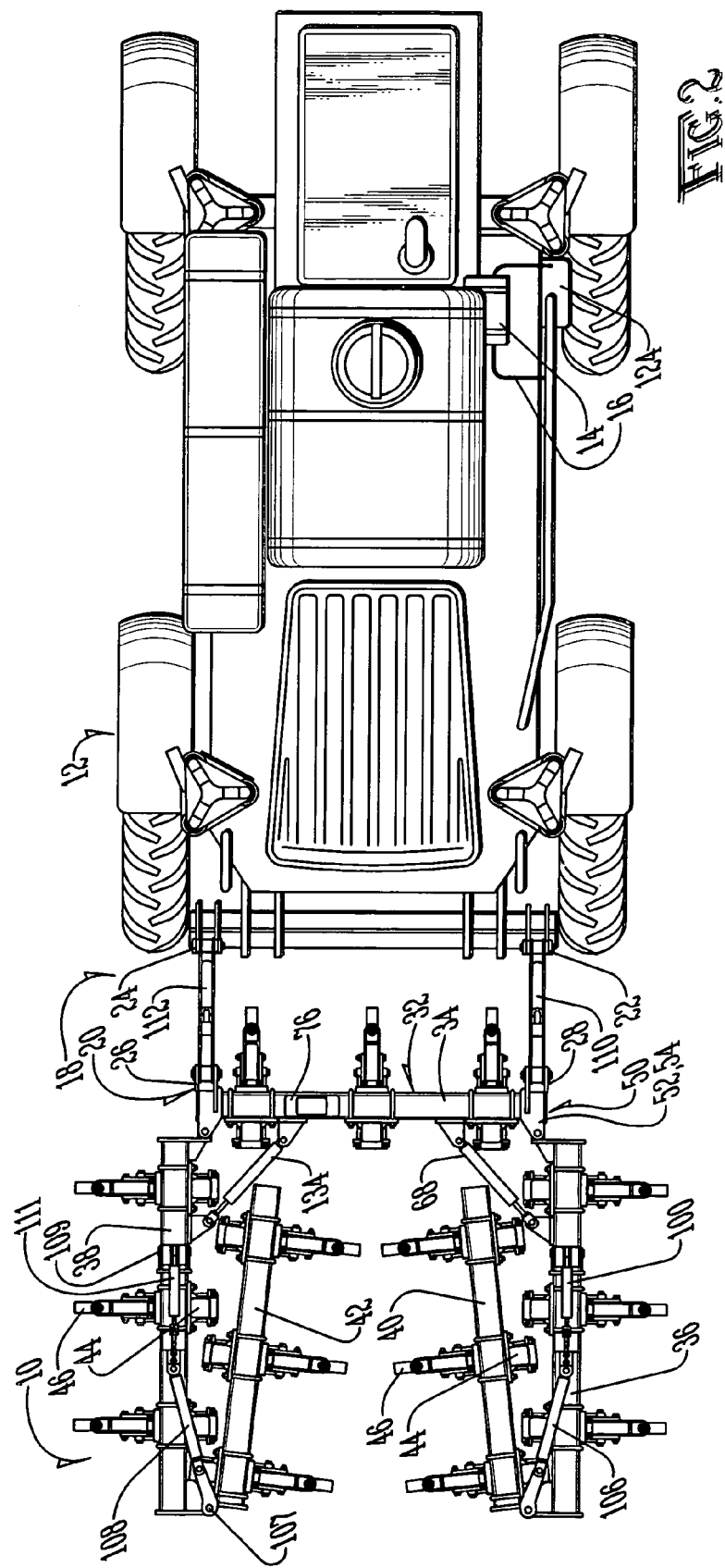
FIG. 2 illustrates a top plan view of the toolbar and vehicle of FIG. 1, shown with the toolbar folded for transport.

As shown in FIG. 1, the floating toolbar (10) includes a main span (32), constructed of five separate bars (34), (36), (38), (40) and (42), hinged to one another and hydraulically actuated to extend as shown in FIG. 1, or to retract as shown in FIG. 2 for transport. In the preferred embodiment, the main span (32) extends from a transport position 3.7 meters wide to a working position 11.4 meters wide. As shown in FIG. 1, coupled to the main span (32) are a plurality of legs (44), secured to the main span (32) by bolts or similar securement means. Although in the preferred embodiment the legs (44) are provided with discs (46), such as those well known in the art, the legs (44) may be provided with sprayers, planters or any other suitable device which may be used in association with an agricultural toolbar. Additionally, while in the preferred embodiment the legs (44) position the main span (32) 2.5 meters from the soil (48), the legs (44)

may be provided with any suitable dimensions and may, of course, be eliminated if it is desired to utilize the floating toolbar (10) with an apparatus that does not require legs (44).

Figure 3:
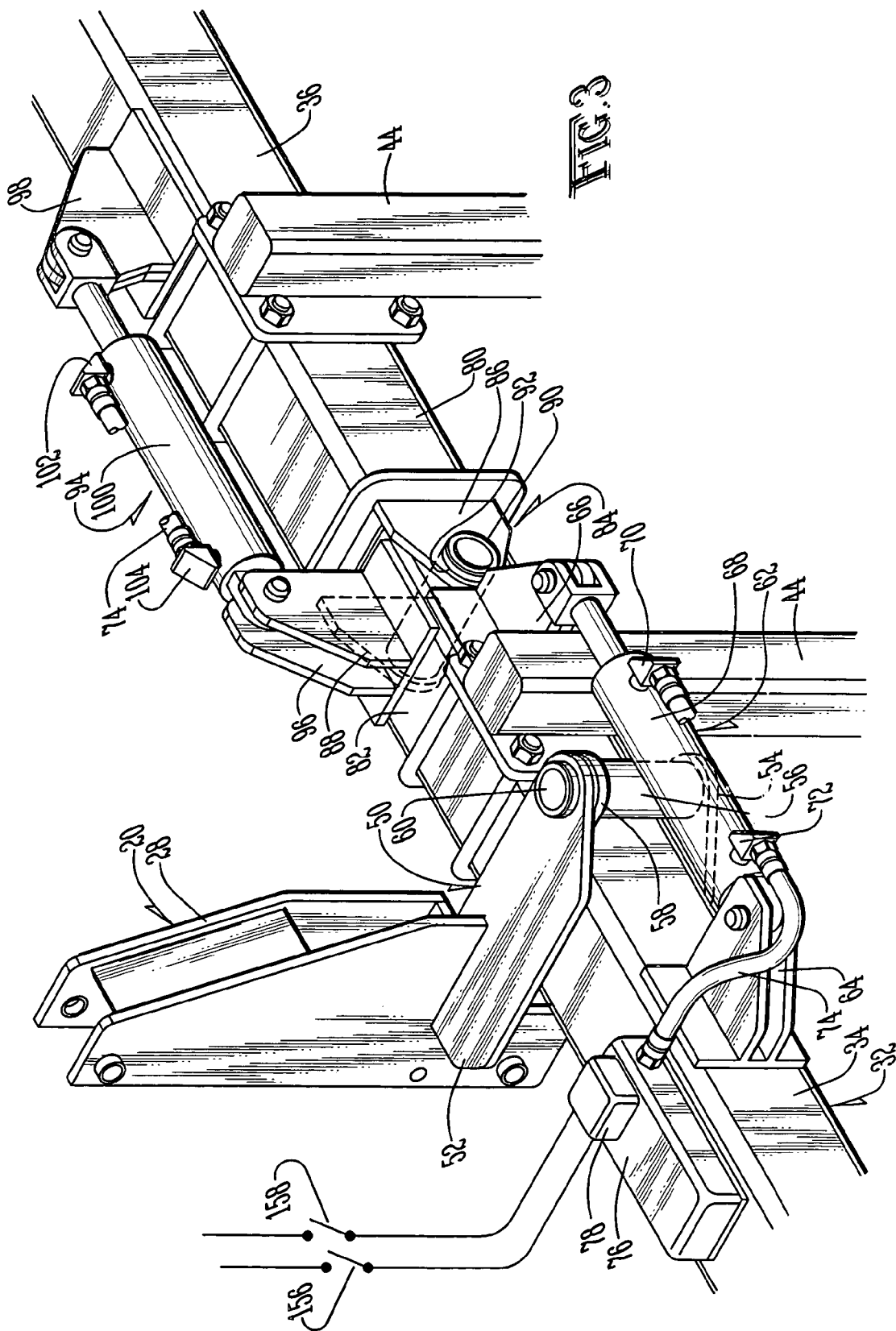
FIG. 3 illustrates a rear perspective view of the connection point between the center bar and left bar of the toolbar.

As shown in FIG. 2, the center bar (34) is coupled to the left bar (36) by a hinge (50). While the hinge (50) may be constructed of any suitable style, in the preferred embodiment, the hinge (50) includes a pair of mounting plates (52) and (54), welded to the center bar (34) (FIGS. 2–3). As shown in FIG. 3, the mounting bar (28) is also welded to the mounting plates (52) and (54). A sleeve (56) is secured to the left bar (36) by a bracket (58), which is welded or otherwise secured to both the sleeve (56) and left bar (36). A pin (60), preferably constructed of steel or similar material, is provided through the mounting plates (52) and (54), and the sleeve (56) to hingeably couple the left bar (36) to the center bar (34).

As shown in FIG. 3, a cylinder assembly (62) couples the left bar (36) to the center bar (34) to prevent the bars (34) and (36) from undesired pivoting relative to one another. The cylinder assembly (62) includes a pair of brackets (64) and (66), pivotably coupled to a hydraulic cylinder (68). As shown in FIG. 3, the hydraulic cylinder (68) is provided with both an extension port (70) and a retraction port (72), which are coupled via hydraulic lines (74) to a hydraulic control box (76) which, in turn, is coupled to an electronic control system (78), both mounted on the center bar (34). Providing the hydraulic control box (76) for the floating toolbar (10) and the electronic control system (78) directly on the center bar (34) allows all of the hydraulic connections between the floating toolbar (10) and the vehicle (12) to be made directly to the hydraulic control box (76), thereby expediting and simplifying the attachment and detachment of the floating toolbar (10) to the vehicle (12).

As shown in FIG. 3, the left bar (36) includes an arm (80) and a knuckle (82). As explained above, it is the knuckle (82) which is coupled to the center bar (34) by the hinge (50). In turn, the knuckle (82) is coupled to the arm (80) by a vertical hinge (84). As shown in FIG. 3, the vertical hinge (84) includes a pair of side plates (86) and (88), welded or otherwise secured to the arm (80), and a pin (90), passing through a hole (92), passing through the knuckle (82). The side of the knuckle (82) facing the arm (80) is preferable chamfered on its edges.

To prevent the left bar (36) from freely pivoting relative to the center bar (34), a cylinder assembly (94) is provided in a manner similar to that described above. A pair of brackets (96) and (98) are welded or otherwise secured respectively to the knuckle (82) and arm (80), and are pivotably coupled to a hydraulic cylinder (100), having an extension port (102) and retraction port (104). In the manner similar to that described above, the extension port (102) and retraction port (104) are coupled to the hydraulic control box (76) by hydraulic lines (74). As shown in FIG. 1, the far left bar (40) is coupled to the left bar (36) by yet another hydraulic cylinder assembly (106), similar to the cylinder assembly (62) described above. Similarly, the far right bar (42) is coupled to the right bar (38) by another hinge (107) and hydraulic cylinder assembly (108), of similar construction. Also, a hinge (109) and hydraulic cylinder assembly (111) is coupled between the center bar (34) and the right bar (38) to manipulate vertical pivoting therebetween.

Figure 4:
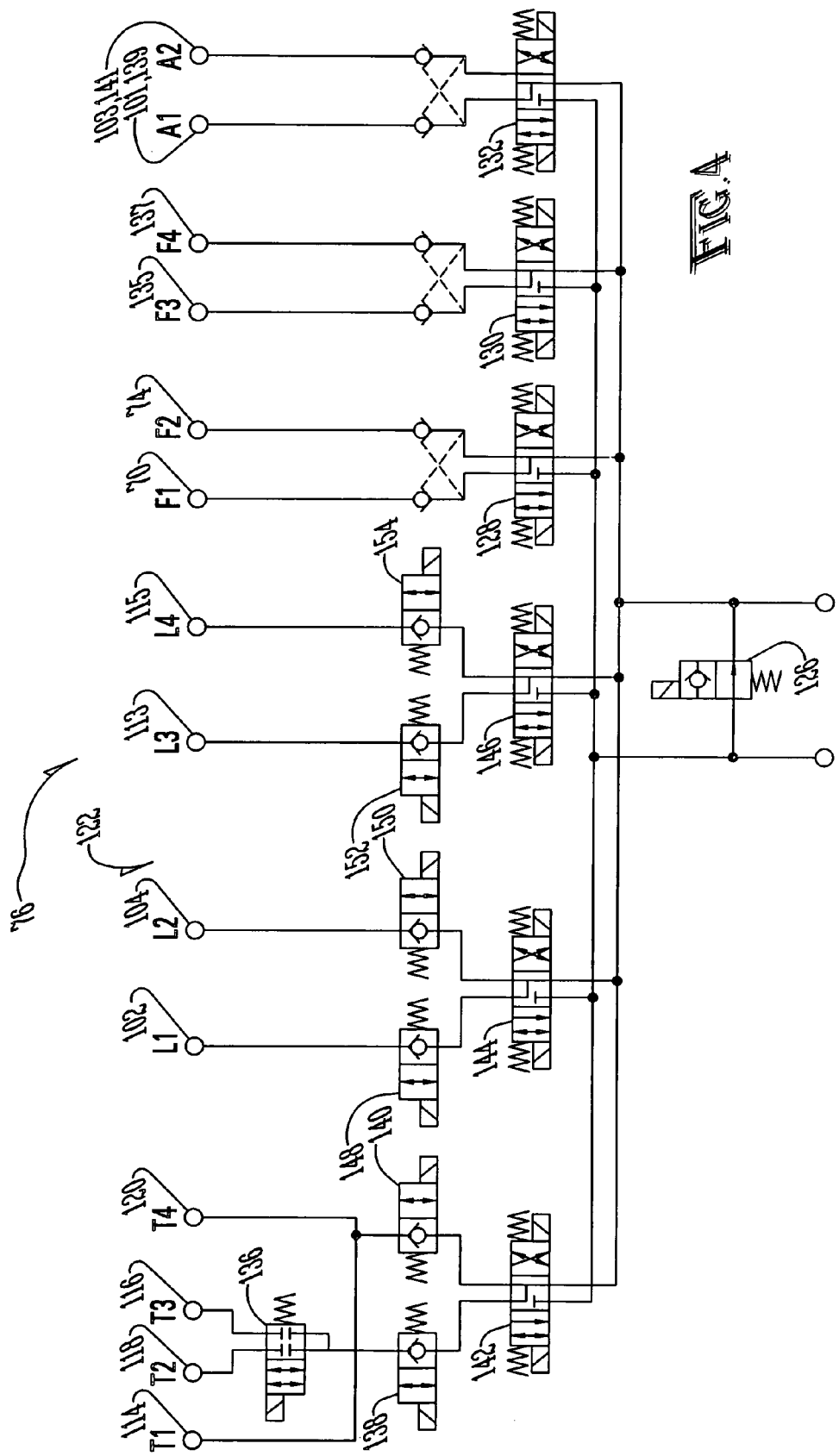
FIG. 4 illustrates a schematic of the fluid flow and valves associated with the toolbar of the present invention.

As shown in FIG. 1, coupled to the four-bar linkage (20) are a pair of cylinder assemblies (110) and (112). The cylinder assemblies (110) and (112) are also provided with extension ports (114) and (116), and retraction ports (118) and (120). The cylinder assemblies (110) and (112) are coupled to the hydraulic control box (76) by hydraulic lines (74). (FIGS. 1 and 3). Shown in FIG. 4 is the schematic diagram (122) of the valve assembly associated with the hydraulic control box (76). As shown, the hydraulic control box (76) has fourteen valves, controlled by electric solenoid coils (not shown) such as those known in the art. The coils are controlled to activate the functions that require multiple valves to be activated. The pressure for the system is provided by the hydraulic motor (14), in fluid communication with the hydraulic fluid reservoir (124), which provides the return from the hydraulic control box (76).

The identity of the terminus points associated with the schematic diagram (122) are as follows:

| | |
|---|---|
| T1 | Connects to left four-bar linkage cylinder (110) extension port (114) |
| T2 | Connects to left four-bar linkage cylinder (110) retraction port (118) |
| T3 | Connects to right four-bar linkage cylinder (112) extension port (116) |
| T4 | Connects to right four-bar linkage cylinder (112) retraction port (120) |
| L1 | Connects to left level cylinder (100) extension port (102) |
| L2 | Connects to left level cylinder (100) retraction port (104) |
| L3 | Connects to right level cylinder (111) extension port (113) |
| L4 | Connects to right level cylinder (111) retraction port (115) |
| F1 | Connects to left main fold cylinder (68) extension port (101) |
| F2 | Connects to left main fold cylinder (68) retraction port (103) |
| F3 | Connects to right main fold cylinder (134) extension port (135) |
| F4 | Connects to right main fold cylinder (134) retraction port (137) |
| A1 | Connects to auxiliary fold cylinders (106) and (108) extension ports (101) and (139) |
| A2 | Connects to auxiliary fold cylinders (106) and (108) retraction ports (103) and (141) |

The hydraulic system associated with the floating toolbar (10) is set up as an open center system. The main hydraulic valve (126) remains open until a function is to be supplied with hydraulic fluid. This main valve (126) does not need to be closed to operate in the float condition.

Valves (128), (130) and (132) control the folding of the floating toolbar (10) for transport. For these valves to work, they must be actuated in combination with valve (126). When it is desired to fold the toolbar for transport, the operator (not shown) actuates the hydraulic motor (14) to actuate the electronic control system (76) which, in turn, actuates the hydraulic control box (76) to retract the hydraulic cylinder assemblies (68), (134), (106) and (108). This retracts the far left bar (44), far right bar (42), left bar (36) and right bar (38) so as to cause the floating toolbar (10) to pivot into the orientation shown generally in FIG. 2. Preferably this brings the width of the floating toolbar (10) to 3.7 meters. As many local ordinances prohibit vehicles wider than 3.7 meters from traveling on roadways without special permission, retraction of the floating toolbar (10) to a width of 3.7 meters is particularly desirable, when the floating toolbar is to be transported on public roadways.

Once the vehicle (12) has transported the floating toolbar (10) to the desired location for utilization, the operator actuates the hydraulic motor (14) to extend the cylinder assemblies (68), (134), (106) and (108) to straighten the floating toolbar (10) to the position shown in FIG. 1. Once the floating toolbar (10) has been straightened, the hydraulic motor (14) actuates the cylinder assemblies (110) and (112) to lower the floating toolbar (10) to the predetermined height, so that the discs (46), or whatever desired implements are associated with the floating toolbar (10), can be engaged for use.

Lifting and lowering of the floating toolbar (10) is accomplished by opening valves (136), (138) and (140), as well as actuating valve (142) in the desired direction. As valves (142), (144), (146), (128), (130) and (132) are three-position, four-way valves, having three settings, the valves must not only be actuated, but must be actuated in the appropriate direction to lift or lower the floating toolbar (10). Once valves (136), (178) and (140) are opened to lift or lower the floating toolbar (10), valve (142) is simply actuated in the appropriate direction.

To lift the left bar (36) and far left bar (40) relative to the center bar (34), valves (126), (148) and (150) are actuated. Valve (144) is then actuated in the appropriate direction. To lower the left bar (36) and far left bar (40) relative to the center bar (34), the flow through valve (144) is simply reversed. Similarly, to raise or lower the right bar (38) and far right bar (42), vales (126), (152) and (154) are opened and valve (126) is actuated in the appropriate direction. Conversely, to lower the right bar (38) and far right bar (42) relative to the center bar (34), valve (146) is reversed to reverse the flow of hydraulic fluid to the cylinders.

The floating toolbar (10) may also be placed into "float" mode, wherein valves (136), (138), (140), (148), (150), (152) and (154) are opened to allow oil to freely flow to and from the associated cylinders to the hydraulic fluid reservoir (124). This allows the ends of the floating toolbar (10) to pivot relative to the center, while the hydraulic fluid within the cylinders prevents undesired jarring or violent movement of the ends relative to the center, which could cause damage or malfunction of the floating toolbar (10). The cylinders in effect act as shock absorbers to attenuate the speed of pivot. As explained below, this shock absorption aspect may be manipulated to accommodate varying terrains. When it is desired to lift the floating toolbar (10), the valves (136), (138), (140), (148), (150), (152), (154), (142), (144), (146) and (126) are all activated. This provides pressure on cylinders (100) and (111), which level the floating tool bar (10) and prevent the left bar (36) and right bar (38) from drooping relative to the center bar (34) as the floating toolbar (10) is raised. Preferably, the system is controlled by a float switch (156) and a master spray switch (158), both coupled to the electronic control system (78). (FIG. 1). If the float switch (156) is actuated and the master spray switch (158) is also actuated, the float circuit is initiated by the opening of valves (136), (138), (140), (148), (150), (152) and (154). If a function of the floating toolbar (10) is actuated while the float circuit is activated, valve (126) closes and the corresponding function valve, such as lift or fold, will also activate. When the floating toolbar (10) is lifted, with the float switch (156) on, valves (136), (138), (140), (148), (150), (152), (154), (142), (144), (146) and (126) are all activated, regardless of the position of the master spray switch (158). This prevents drooping of the floating toolbar (10).

If the float switch (156) is activated, and the floating toolbar (10) is lowered, valves (136), (138), (140), (142) and (126) are actuated, regardless of the position of the master spray switch (158), to provide the floating toolbar (10) with the float function. Preferably, the valves are adjustable to increase or decrease flow in the hydraulic cylinders in the float function. If it is desired to have the floating toolbar (10) react to changes in terrain more quickly, fluid flow through the cylinders is increased. Conversely, if it is desired to have the floating toolbar (10) react to variation in the terrain more slowly, fluid flow through the cylinders is decreased.

Although the invention has been described with respect to a preferred embodiment thereof, it is to be understood that it is not to be so limited, since changes and modifications can be made therein which are within the full, intended scope of this invention as defined by the appended claims. For example, it is anticipated that the floating toolbar (10) may be constructed of any desired material, of any suitable dimensions or spacing, sufficient to accommodate a particular crop. It is additionally anticipated that the floating toolbar (10) may be hydraulically, pneumatically or mechanically actuated, and that the floating toolbar (10) may be permanently fixed in a position relative to the vehicle (12). It is also anticipated that the floating toolbar (10) may be provided in seven or more sections, having sixteen legs (44) of any suitable articulation or implement assembly. It is also anticipated that each articulation may be provided with both float and fold hydraulic cylinders, in a manner such as that described above.

What is claimed is:

1. A ground engaging agricultural toolbar comprising:
   (a) a first bar section;
   (b) first means coupled to said first bar section for engaging the ground;
   (c) a second bar section pivotably coupled to said first bar section;
   (d) second means coupled to said second bar section for engaging the ground;
   (e) a first arm coupled to said first bar section and said first ground engaging means;
   (f) a second arm coupled to said second bar section and said second ground engaging means;
   (g) wherein said first arm, said second arm and said frame define an area sufficient to accommodate the passage of a plant at least approximately one meter in height; and
   (h) means coupled between said first bar section and said second bar section for buffering pivoting of said first bar section relative to said second bar section in response to said first ground engaging means and said second ground engaging means engaging uneven terrain.

2. The ground engaging agricultural toolbar of claim 1, wherein said buffering means is a linear actuator.

3. The ground engaging agricultural toolbar of claim 1, wherein said first bar section is pivotably coupled to said second bar section along a first degree of freedom and along a second degree of freedom.

4. The ground engaging agricultural toolbar of claim 3, wherein said buffering means is means for buffering pivoting of said first bar section relative to said second bar section along said first degree of freedom.

5. The ground engaging agricultural toolbar of claim 4, further comprising means coupled between said first bar section and said second bar section for retracting said first bar section toward said second bar section along said second degree of freedom.

6. The ground engaging agricultural toolbar of claim 5, wherein said retracting means is a hydraulic cylinder.

7. The ground engaging agricultural toolbar of claim 1, further comprising a third bar section pivotably coupled to said first bar section.

8. The ground engaging agricultural toolbar of claim 7, wherein said second bar section and said third bar section are pivotably coupled to said first bar section along a first degree of freedom and along a second degree of freedom.

9. The ground engaging agricultural toolbar of claim 8, wherein said first degree of freedom is about a ninety-degree angle from said second degree of freedom.

10. The ground engaging agricultural toolbar of claim 1, further comprising means for raising said first ground engaging means off the ground.

11. The ground engaging agricultural toolbar of claim 10, wherein said raising means is a hydraulic cylinder coupled between said first bar section and an agricultural vehicle.

12. A ground engaging agricultural toolbar comprising:
(a) a first bar section;
(b) first means coupled to said first bar section for engaging the ground;
(c) a second bar section pivotably coupled to said first bar section;
(d) second means coupled to said second bar section for engaging the ground;
(e) a fluid cylinder coupled to said first bar section and said second bar section;
(f) means for moving said first bar section relative to said second bar section by moving a fluid within said fluid cylinder; and
(g) means for buffering movement of said first bar section relative to said second bar section wherein said buffering means comprises means for translating a decrease in support of said second ground engaging means into movement of fluid within said fluid cylinder sufficient to buffer movement of said second bar section relative to said first bar section.

13. The ground engaging agricultural toolbar of claim 12, wherein said buffering means further comprises means for translating contact of said second ground engaging means with uneven terrain into fluid movement within said fluid cylinder sufficient to buffer movement of said second bar section relative to said first bar section.

14. The ground engaging agricultural toolbar of claim 12, wherein said fluid cylinder is a hydraulic cylinder.

* * * * *